MODULATED DETECTOR RECEPTION OF CONTINUOUS WAVES

Filed June 11, 1946 2 Sheets-Sheet 1

INVENTOR
Dana A. Griffin and Leland C. Walter
BY C. A. Newton
ATTORNEY

MODULATED DETECTOR RECEPTION OF CONTINUOUS WAVES

INVENTOR
Dana A. Griffin and Leland C. Waller
BY C. A. Norton
ATTORNEY

UNITED STATES PATENT OFFICE 2,514,859

MODULATED DETECTOR RECEPTION OF CONTINUOUS WAVES

Dana A. Griffin, North Plainfield, N. J., and Leland C. Waller, Bayside, N. Y., assignors to Communication Measurements Laboratory, New York, N. Y., a partnership consisting of Dana A. Griffin, Brunson S. McCutchen, and William J. Hammond Application June 11, 1946, Serial No. 675,854

10 Claims. (Cl. 250—8)

Figure 1:
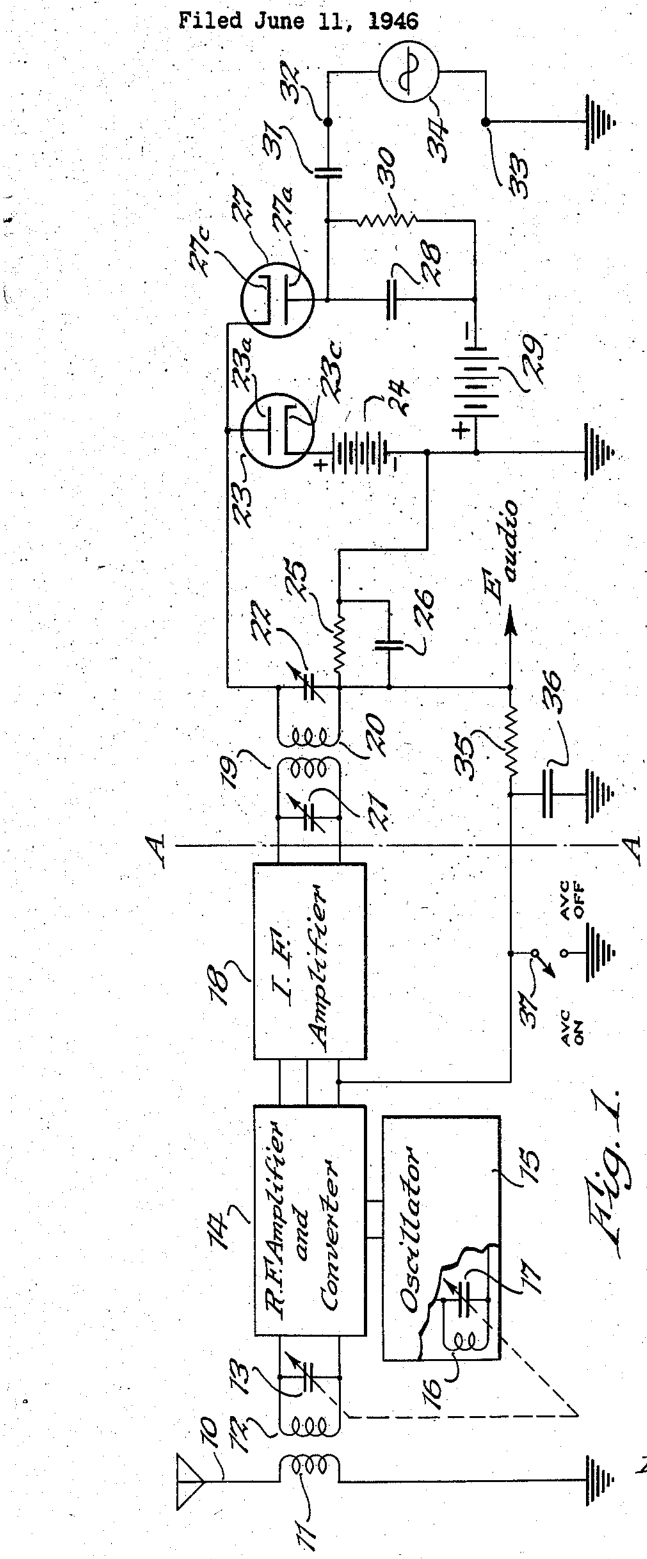

This invention relates to a new method and system for receiving continuous wave keyed signals or "pulsed" signals, such as those transmitted by radio telegraph transmitters, pulse transmitters, and allied types of equipment.

According to present practice, the usual method of receiving keyed continuous wave signals employs a beat frequency radio frequency oscillator which is tuned to within about 1,000 cycles per second of the frequency of the last intermediate frequency signal. This beat frequency is then mixed with the signal in the second detector circuit, producing an audio signal of about 1,000 cycles per second, corresponding to the frequency difference between the local oscillator and the incoming signal.

In spite of its common use, reception of signals in this way has a number of disadvantages, among the most serious of which may be mentioned the following:

Noise components present in the circuits where the mixing takes place also produce beats with the output of the beat frequency oscillator, and this is evidenced by a jump in the noise level when the beat frequency oscillator is turned on.

In addition to the image trouble caused by the first frequency converter in the case of a superheterodyne, there is an audio image created in the output of the second detector, which occurs whenever an interfering radio frequency signal comes into the second detector, the frequency of which happens to be twice the audio beat frequency away from the desired radio frequency signal, and whose intermediate frequency component is on the opposite side of the beat frequency oscillator frequency from that of the I. F. component of the desired signal.

This is analogous to image interference, well known in broadcast receivers of the superheterodyne type. This effect can be minimized by the provision of a highly selective intermediate frequency amplifying system, but is rarely entirely eliminated in actual practice.

It is an object of our invention to provide a new system and method for the reception of such signals, which not only eliminates or greatly reduces many of the disadvantages now inherent in the usual system, but also has many advantages over the best of the presently-known systems. Moreover, specifically, It is an object of our invention to provide a new system of reception of continuous wave signals which will give an improvement in signal-to-noise ratio many times greater than can be obtained from known systems.

It is a further object of our invention to provide such a system which will deliver audible signals, the tone frequency of which remains constant, thus making it practicable to make use of a low tone, heretofore considered impractical because of the difficulty of maintaining the beat note constant.

It is a further object of our invention to provide a system which will allow the operator a choice of tone frequency for received signals to reduce operator aural fatigue.

It is a further object of our invention to provide a system giving automatic noise reduction on large noise peaks and eliminating all noise having sustained small peak values.

It is a further object of our invention to provide automatic audio signal limiting at almost any desired output voltage level, regardless of the value of input R. F. signal, over a large input signal voltage range.

It is a further object of our invention to provide a system which gives in effect the same results as A. V. C. action in broadcast receivers, heretofore generally ineffective when applied to continuous wave keyed signals.

It is a further object of this invention to provide a system which effectively increases the overall gain of the receiver by delivering the maximum audio output in the sharpest position of the crystal filter selectivity switch, heretofore commonly used, which also corresponds to the maximum intermediate frequency gain, and which is not true of the beat frequency oscillator method of reception heretofore used.

It is a further object of our invention to provide a true "single signal" method of reception by modulating the signal in the audio detector circuit after the pure I. F. signal has passed through the selective I. F. system, and without recourse to a local beat oscillator.

It is a further object of this invention to provide improved "adjacent channel" selectivity of the receiver and to eliminate certain difficulties encountered with adjacent channel interference in receivers of the conventional type.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which Fig. 1 is a circuit diagram of what is for some purposes the preferred embodiment of our invention, Fig. 2 is a series of curves illustrating the operation of our invention, and Figs. 3 and 4 are partial circuit diagrams of alternative forms of our invention.

In the various figures, like reference numerals indicate like parts.

Figure 2:
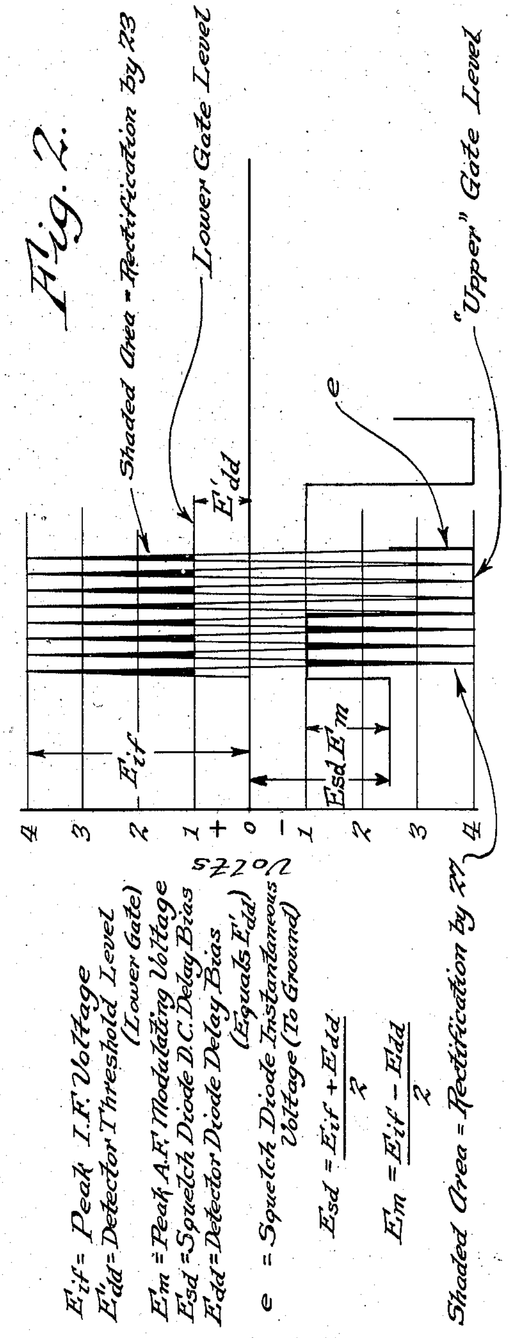
Figure 3:
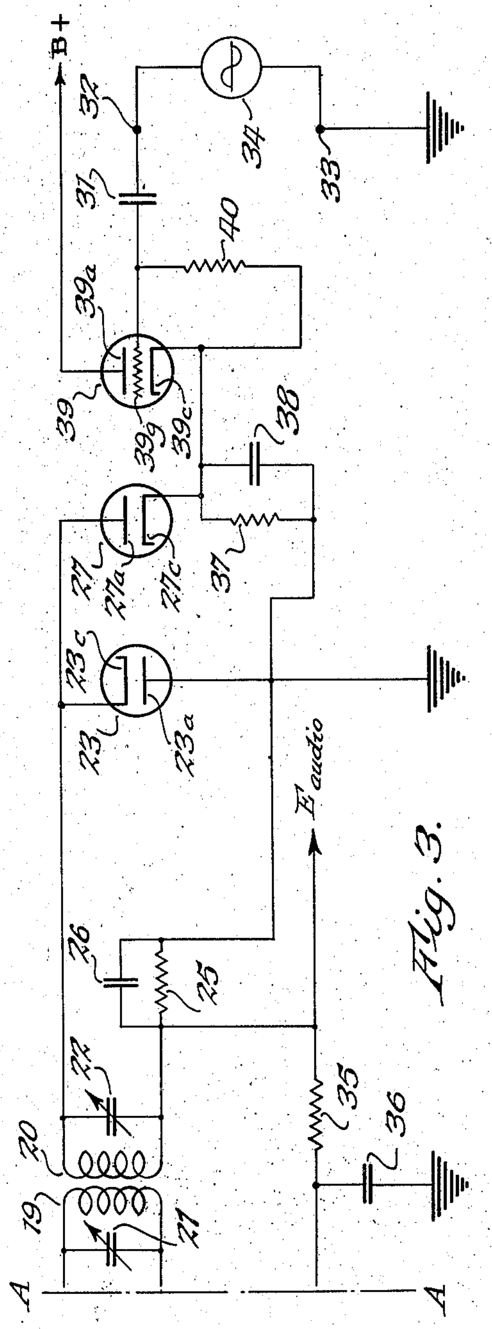
Figure 4:
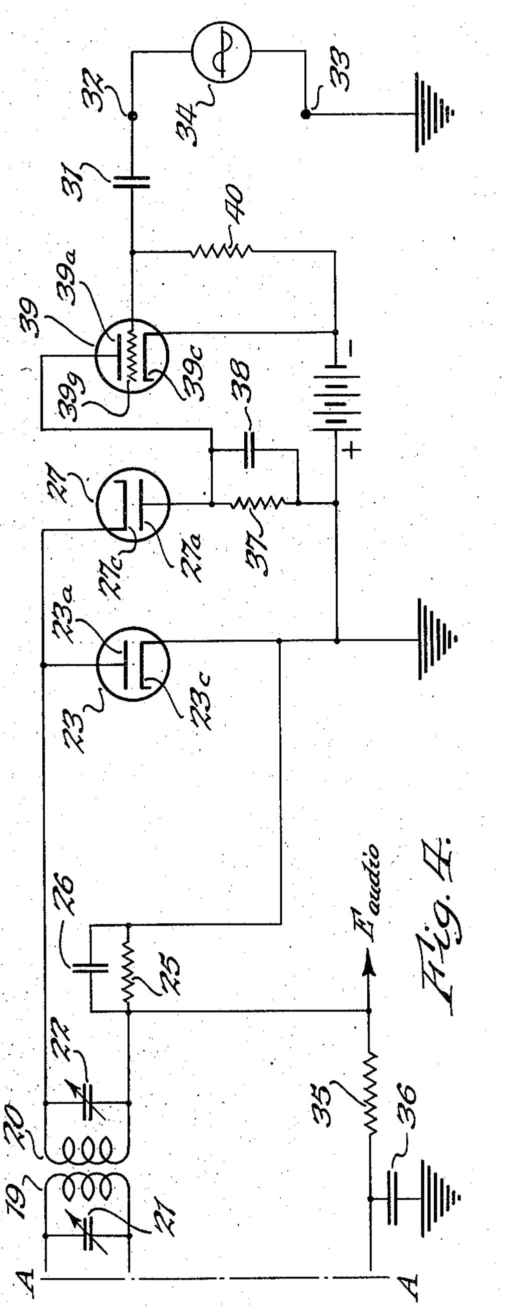

In Figs. 3 and 4, for purposes of simplicity, the parts lying to the left of dotted line A—A have been omitted, but it will be understood that in setting up the apparatus the parts to the right of lines A—A in Figs. 3 and 4 may be substituted in Fig. 1 for the parts to the right of line A—A. Because, as already stated, Fig. 1 is, for most purposes, the preferred and simplest embodiment of our invention, its construction and operation will first be described, after which the alternative forms in Figs. 3 and 4 will be described.

Referring now to Fig. 1, 10 represents an antenna of any suitable type, which may be connected to ground through coupling coil 11, which is in turn coupled to input coil 12, tuned by variable condenser or other tuning instrumentality 13. This circuit is connected to the input of the radio frequency amplifier and converter unit 14, which may be supplied by local oscillator 15, in turn tuned by inductance 16 and variable condenser 17, or other tuning instrumentality, which latter may be ganged for tuning with condenser 13, as is customary.

Since the details of the radio frequency amplifier and converter unit and the local oscillator are well known in the art and are not per se a part of our invention except to the extent described hereinafter, they are not shown nor described in detail.

The output of converter unit 14 may be supplied to I. F. amplifier 18 of any suitable type, and the output of the I. F. amplifier may be supplied through coupling coils 19 and 20 tuned by condensers 21 and 22 to our improved detector circuit. It is our improved detector circuit and the improved methods of detection employed therein which give our system its advantages as we now understand them.

We employ a pair of rectifiers of similar characteristics. While herein shown, for simplicity, as diodes, they may be triodes or other thermionic rectifiers, or may even be crystal detectors, subject only to the condition they shall have, as nearly as possible, identical or similar characteristics.

In the embodiment shown, diode 23 may have cathode 23c and anode 23a, and the anode may be connected directly to one common point of inductance 20 and condenser 22. The other diode 27 may comprise cathode 27c and anode 27a, and its cathode 27c may be connected directly to anode 23a of diode 23. As here shown, the diodes 23 and 27 are in separate envelopes, but it will be understood that they may both be mounted within a single envelope, if desired.

Cathode 23c of diode 23 may be connected through a "lower gate" biasing battery 24 and through resistance 25 shunted by condenser 26 to the opposite common terminals of inductance 20 and condenser 22. Anode 27a of diode 27 may be connected through resistance 30 shunted by condenser 28 and through biasing battery 29 to cathode 23c of diode 23 and to ground. Both biasing batteries 24 and 29 may be termed negative delay biases, and their action will best be understood by reference to Fig. 2 and the subsequent portion of this specification, wherein the circuit action is explained.

A pair of terminals 32 and 33 may be provided, 32 being connected through blocking condenser 31 to anode 27a of diode 27, and terminal 33 being connected to ground. Between these terminals we connect a suitable source of audio tone voltage of the frequency which it is desired for the signals to have in the receivers, loud speaker, or other output device, and this source may be controllable in frequency, if desired, to permit the operator to change the signal tone frequency. It may also be controllable in amplitude.

A connection may be made to the common point of resistor 25, condenser 26, and condenser 22, and audio voltage may be withdrawn from this point and supplied to a suitable audio amplifier and indicator not shown, but merely indicated as the arrowhead designated $E_{audio}$. From this point, a connection may be taken back to the radio frequency amplifier, converter, and I. F. amplifier through resistance 35 and filter condenser 36 to ground, this connection affording a voltage which may be impressed upon the grids of the R. F. amplifier, converter, and I. F. amplifier tubes, when the circuit is to be used for conventional A. V. C. operation on radio-telephone-type signals. For normal M. D. R.[1] reception of keyed continuous-wave signals, this A. V. C. bias is usually shorted to ground by switch 37.

[1] Our invention is termed "Modulated Detector Reception," or "M. D. R."

The operation of the receiver will now be explained with reference to Fig. 2, wherein incoming signals impressed on the detector circuit are illustrated as $E_{if}$. In this figure the curves are plotted as voltage curves about a horizontal zero axis, the upward excursions representing positive and the downward negative voltages, as usual.

The steady voltage of $E_{dd}$ (diode 23 delay bias) is the voltage of bias battery 24, and is equal to $E'_{dd}$ (detector threshold level or "lower gate"). In addition, the following relations are established:

$$E_{sd}=\frac{E_{if}+E_{dd}}{2}$$

$$E_M=\frac{E_{if}-E_{dd}}{2}$$

Also, it can be shown that $$E_{sd}-E_M=-E'_{dd}$$

The magnitude of voltage $E_{dd}$, which operates as a delay bias voltage (I. F. signals must exceed this amplitude before rectification can occur), is so chosen as to eliminate most, if not all, of the low residual background noise so as to insure quiet operation at low values of signal voltage, and equals the detector threshold level, or "lower gate," $E'_{dd}$. The peak magnitude of $E_M$, the tone frequency voltage, is so chosen that its negative peaks coincide with, or are slightly greater in the negative sense, than the maximum signal voltage, and preferably $E_M$ is given a square wave form of not too rapid rise and decay time. With these explanations of the voltages involved, their magnitudes, and their interrelation, the circuit operation may now be understood.

It will be seen that diode 23 obtains its input signal from the output of the I. F. amplifier and is so connected that it rectifies the positive half cycles of the I. F. signal, as shown in the positive zone of Fig. 2.

The "lower gate" action may now be understood as it operates in the positive half cycle rectification. Because of the polarity of battery 24, anode 23*a* is biased negative with respect to cathode 23*c* by the amount $E_{dd}$, and diode 23 does not begin to rectify until incoming signals are sufficient to overcome voltage $E_{dd}$ and make diode anode 23*a* positive with respect to its cathode. This eliminates all rectification of positive voltage signals or noise until they reach the threshold value $E'_{dd}$.

Turning now to the action of diode 27, this we term the "squelching diode," and it will be noted that in this rectifier a rather more complicated action takes place. In the absence of any voltage provided by source 34, anode 27*a* of diode 27 would be negative with respect to cathode 27*c*, by voltage $E_{sd}$, because of the provision of biasing battery 29.

When source 34 is in operation, the potential of anode 27*a* swings alternately in a positive and negative direction, becoming during one-half cycle of source 34, negative with reference to its cathode only by the amount $E'_{dd}$ $(E_{sd}-E_M)$ and then negative with respect to its cathode by the amount $E_{sd}+E_M$. During the former half cycle, diode 27 will rectify signals more negative than $E_{dd}$, whereas during the latter it will not.

The result of this is rectified current for each positive half of the I. F. signal cycle above the lower gate valve $E_{dd}$, as shown in the positive zone of Fig. 2, and rectified current from diode 27 for each negative half of the I. F. signal for each positive half cycle of tone generator 34, as shown in the negative zone of Fig. 2.

Since these rectified currents flow in opposite directions, during the half cycle of the tone generator when both diodes are rectifying, the net result is zero rectification during each alternate half cycle of the tone generator. When diode 27 is not rectifying, the net result is the flow of rectified current from diode 23.

Amplitude limiting on noise exceeding the upper gate level is provided, because when the I. F. voltage exceeds the upper gate level, both diodes rectify, and to the extent that positive and negative halves of the I. F. signal wave are symmetrical, the rectified current of both diodes is equal and the net current is zero. Because noise is limited both at upper and lower values, we term this action "double gate action." If battery 24 is eliminated, the "lower gate" action is also eliminated, and only "upper gate" action occurs.

An advantage of this circuit is that $E_{dd}$ can be varied without changing $E_{sd}$. For example, if we make $E_{dd}$ zero, eliminating the lower gate action, we need only increase $E_M$ by the same amount we decrease $E_{dd}$, in order to maintain 100% modulation of the signal.

It is the net rectified current which gives rise to both the audio and automatic volume control voltage, and it will be noted that the "lower gate" level is established by selecting the value of $E_{dd}$ so that the residual or background or low signal noise level is substantially eliminated. This feature in part accounts for the lack of noise with our receiver in the absence of a signal.

In the case of a weak signal, $E_{dd}$ is made as small as is consistent with the residual noise level. Thus, when the I. F. components due to the weak signal appear, they are modulated in amplitude by the I. F. components due to the noise. Because the noise is not usually prominent in the absence of the signal, it can be said that they tend to reinforce each other, but they both are modulated at the chosen audio frequency of tone generator 34.

If this is 800 cycles, a burst of noise, after the output signal voltage E passes through a highly selective A. F. filter, whose pass-band includes the frequency of tone generator 34, appears in the telephones or loud speaker as a burst of 800 cycles. However, practically all of the rasping, grating, and other unpleasant sounds usually resulting from noise in conventional receivers have by this time been eliminated.

Additional audio frequency selectivity can be employed if desired, by means of a sharply resonant mechanical or piezoelectric reproducer. Thus, it will be seen that our invention permits the fullest utilization of all three types of receiver selectivity; that is, R. F., audio frequency, and mechanical. If the average operator's ear has a response peak at 1,000 cycles per second and the frequency of generator 34 is set at 1,000 cycles, then a fourth type of selectivity, that inherent in the operator's ear, can be utilized.

Turning now to the alternative circuits of Figs. 3 and 4, Fig. 3 differs from Fig. 1 principally in the provision of tube 39, herein shown as a triode, interposed between tone generator 34 and the detector circuit, and also in the omission of the lower noise level bias battery 24. In this instance tube 39 may be a triode containing cathode 39*c*, control electrode 39*g*, and anode 39*a*, and control electrode 39*g* may be connected to cathode 39*c* through leak resistor 40.

Control electride 39*g* may be connected through condenser 31 to terminal 32 as before, and anode 39*a* to a +B source, not shown, the negative terminal of which may be grounded. Cathode 39*c* may be connected to cathode 27*c* of diode 27, the other connections remaining as before, with the exception of the omission of bias batteries 24 and 29. In this instance the upper gate action is due at least in part to the operation of tube 39, but no lower gate action occurs.

Tube 39 is a zero biased triode. Therefore, when the voltage of source 34 is zero (or positive), some triode plate current $I_P$ will flow through resistor 37, causing a direct current voltage to be built up across resistor 37. This voltage has its positive polarity facing cathode 27*c* of diode 27, and thus prevents diode 27 from rectifying until the positive peak voltage exceeds the value of the cathode bias.

When the voltage of source 34 goes positive, plate current $I_P$ of triode 39 is not greatly changed on the positive half cycles due to the grid leak action of resistor 40, and the grid and control electrode 39*g* remains substantially at zero bias. On the negative half cycles, however, tube 39 reaches plate current cutoff (assuming that the grid voltage from source 34 is sufficiently large), and diode 27 then reaches practically 100% rectification, cancelling the current output of diode 23. It will be seen that whenever the voltage of source 34 is either zero or positive, diode 24 is not rectifying and $E_{audio}$ reaches a positive maximum.

Referring now to Fig. 4, the principal difference between Fig. 3 and Fig. 4 is that diodes 23 and 27 are connected reversely with respect to their direction of current flow. In Fig. 4, therefore, it is necessary to connect resistance 37 in the plate circuit of tube 39 so that the plate current resistance drop across resistance 37 will have its negative polarity facing the plate of diode 27. This arrangement is necessary so that when the voltage of source 34 is zero or positive, triode plate current flows in tube 39, producing a voltage drop through resistance 37, which in turn is the upper gate bias for diode 27.

On the negative half cycles of source 34, the plate current of tube 39 is cut off so that the voltage drop through resistance 37 is zero and diode 27 rectifies practically 100% and neutralizes the rectified current of diode 23.

As an example of the advantages of our invention, we have found signal/noise ratios of from 150/1 to 200/1 in tests made with about 0.6 microvolt input at 4.6 megacycles, using a standard SX-28 Hallicrafter feeding our detector system, whereas under the same conditions, but using the conventional beat frequency oscillator method, about 8/1 was the best that could be obtained.

"Adjacent channel" selectivity is also effectively greatly increased. For example, with our system, two R. F. signals only 30 or 40 cycles apart can be completely separated and yet each one can be modulated, in the detector circuit, by a tone frequency of any desired value. The I. F. passband need be only wide enough to pass the A. C. signal components which are a function of the keying speed. Critical adjustment of the undesired signal into the "zero-beat" notch, such as is necessary with the beat frequency oscillator method, is eliminated in our system.

We have found that our system provides automatic audio signal limiting at almost any desired output voltage level, regardless of the value of input R. F. signal, over a large input signal voltage range. For example, tests show that a variation of input signal in the ratio of 100,000/1 produces substantially no change in the A. F. output signal level.

While we have used the term "continuous wave keyed signals" in the claims, we include within the meaning of such term not only continuous waves keyed manually, but also any form of transmission in which the transmitter is always full on, or full off, such as in automatic high speed mechanical or electrical keying, as in pulsed signals.

In the specification we have explained the principles of our invention and the best mode in which we have contemplated applying those principles, so as to distinguish our invention from other inventions; and we have particularly pointed out and distinctly claimed the part, improvement, or combination which we claim as our invention or discovery.

While we have shown and described certain preferred embodiments of our invention, it will be understood that modifications and changes may be made without departing from the spirit and scope thereof, as will be clear to those skilled in the art.

We claim:

1. In a receiver for receiving continuous wave keyed signals, in combination, a pair of rectifiers having dissimilar electrodes connected together, means for impressing said signals on said rectifiers, means for impressing on one only of said rectifiers a polarizing voltage of audio frequency producing a periodic variation of rectifier current, means for additionally impressing on said rectifiers respectively direct current delay biasing voltages of different magnitudes and means for combining the current output of said rectifiers.

2. In a receiver for receiving continuous wave keyed signals, in combination, a pair of thermionic rectifiers having dissimiliar electrodes connected together, means for impressing said signals on said rectifiers, means for impressing on one only of said rectifiers a polarizing voltage of audio frequency producing a periodic variation of rectifier current, means for additionally impressing on said rectifiers respectively direct current delay biasing voltages of different magnitudes and means for combining the current output of said rectifiers.

3. In a receiver for receiving continuous wave keyed signals, in combination, a pair of diode thermionic rectifiers having dissimilar electrodes connected together, means for impressing said signals on said rectifiers, means for impressing on one only of said rectifiers a polarizing voltage of audio frequency producing a periodic variation of rectifier current, means for additionally impressing on said rectifiers respectively direct current delay biasing voltages of different magnitudes and means for combining the current output of said rectifiers.

4. The combination claimed in claim 1, in which the direct current delay biasing voltage on the rectifier having the audio frequency polarizing voltage is greater than the delay biasing voltage impressed on the other rectifier.

5. A detector system for continuous wave keyed signals, comprising, in combination, a pair of rectifiers having their dissimilar electrodes connected together, means for impressing signals to be detected on said rectifiers, means for impressing direct current delay biasing voltages of different values on said rectifiers respectively, means for impressing on the rectifier having the larger delay bias an alternating polarizing voltage of audio frequency producing a periodic variation in the amplitude of rectified current, and means for combining the current output of said rectifiers.

6. A detector system for continuous wave keyed signals, comprising, in combination, a pair of thermionic rectifiers having their dissimilar electrodes connected together, means for impressing signals to be detected on said rectifiers, means for impressing direct current delay biasing voltages of different magnitudes on said rectifiers respectively, and means for impressing on the rectifier having the larger delay bias an alternating polarizing voltage of audio frequency insufficient at its positive peak to overcome all of the delay bias producing a periodic variation in the amplitude of rectified current, and means for combining the current output of said rectifiers.

7. A detector system for continuous wave keyed signals, comprising, in combination, a pair of diode thermionic rectifiers having their dissimilar electrodes connected together, means for impressing signals to be detected on said rectifiers, means for impressing direct current delay biasing voltages of different magnitudes on said rectifiers respectively, and means for impressing on the rectifier having the larger delay bias an alternating polarizing voltage of audio frequency the positive peak of which reduces the effective bias of said rectifier to substantially the magnitude of the delay bias on the other of said rectifiers, producing a periodic variation in the amplitude of rectified current, and means for combining the current output of said rectifiers.

8. The combination claimed in claim 1, with means for deriving an automatic volume control voltage from the combined current output of said rectifiers.

9. The combination claimed in claim 1, with means for deriving an automatic volume control voltage from the combined current output of said rectifiers, and means for impressing said voltage on at least one of the tubes preceding said rectifiers.

10. The method of demodulating continuous wave keyed signals, which comprises the steps of separately rectifying positive and negative half cycles of signal waves in excess of a predetermined threshold amplitude, periodically preventing the rectification of half cycles of one sign at an audible rate, and combining the rectified currents produced from both half cycles in an opposing sense.

DANA A. GRIFFIN.
LELAND C. WALLER.

REFERENCES CITED

The following references are of record in the file of this patent:

UNITED STATES PATENTS

| Number | Name | Date |
|---|---|---|
| 1,615,636 | Langmuir | Jan. 25, 1927 |
| 2,194,499 | Gelzer | Mar. 26, 1940 |
| 2,283,404 | Wood | May 19, 1942 |
| 2,293,501 | Hansell | Aug. 18, 1942 |
| 2,419,548 | Grieg | Apr. 29, 1947 |

FOREIGN PATENTS

| Number | Country | Date |
|---|---|---|
| 192,429 | Great Britain | Feb. 8, 1923 |